United States Patent [19]

Radlove et al.

[11] 3,872,162

[45] Mar. 18, 1975

[54] STABILIZED ETHYLENICALLY UNSATURATED BETA-HYDROXY ESTERS PREPARED FROM A POLYEPOXIDE AND ACRYLIC OR METHACRYLIC ACID

[75] Inventors: Sol B. Radlove, Chicago; Abraham Ravve, Lincolnwood; Kenneth H. Brown, Chicago, all of Ill.

[73] Assignee: Continental Can Company, Inc., New York, N.Y.

[22] Filed: July 12, 1973

[21] Appl. No.: 378,759

[52] U.S. Cl............ 260/486 B, 260/410, 260/410.5
[51] Int. Cl............................................. C07c 69/54
[58] Field of Search ...................... 260/486 B, 485 G

[56] References Cited
UNITED STATES PATENTS
3,373,075  3/1968  Fekete............................ 260/486 B FOREIGN PATENTS OR APPLICATIONS
2,027,444  12/1970  Germany.......................... 260/486 B

*Primary Examiner*—Lorraine A. Weinberger
*Assistant Examiner*—Paul J. Killos
*Attorney, Agent, or Firm*—Paul Shapiro; Joseph E. Kerwin; William A. Dittmann

[57]   ABSTRACT

An ethylenically unsaturated beta-hydroxy ester stabilized to gel formation is obtained by reacting at a temperature less than 110°C a polyepoxide with acrylic or methacrylic acid in the presence of an divalent tin salt and an alkaline catalyst.

8 Claims, No Drawings

STABILIZED ETHYLENICALLY UNSATURATED BETA-HYDROXY ESTERS PREPARED FROM A POLYEPOXIDE AND ACRYLIC OR METHACRYLIC ACID

BACKGROUND OF THE INVENTION

1. Field of Invention

This invention is related to ethylenically unsaturated beta-hydroxy ester compositions and more particularly, to stabilized beta-hydroxy ester compositions susceptible to polymerization using ionizing radiation.

2. The Prior Art

Printing or decorating metal substrates is conventionally accomplished using links composed predominately of a drying oil vehicle pigmented to the desired color which is dried by baking in air. Conventional printing inks prepared with drying oil vehicles contain a substantial amount of a volatile organic solvent which must be removed as the ink dries. The evaporation of the solvent creates an air pollution problem which many present day communities will not tolerate.

One method of avoiding the use of solvents in preparing printing ink vehicles which has been attempted by the art is to prepare the vehicle from an unsaturated polyester composition of suitable viscosity which can be polymerized and dried by exposure to ionizing radiation as for example, U.S. Pat. Nos. 3,326,710, 3,511,687, 3,551,235, 3,551,246, 3,551,311, and 3,558,387.

One class of unsaturated compositions which has been found particularly suitable as ultraviolet curable ink vehicle components are the ethylenically unsaturated beta-hydroxy esters. Ethylenically unsaturated beta-hydroxy esters are known to the art and are prepared by reacting a polyepoxide having at least 2 reactive epoxide groups with an ethylenically unsaturated carboxylic acid such as acrylic or methacrylic acid.

Heretofore, ethylenically unsaturated beta-hydroxy esters have been prepared through the use of tertiary amines as a catalyst e.g., U.S. Pat. Nos. 2,824,851, with the inclusion of a vinyl polymerization inhibitor such as hydroquinone. The storage life of such ester products has been limited as the esters are very reactive monomeric materials and form useless gels when stored for short periods. The presence of vinyl polymerization inhibitors in the ester product interferes with the sensitivity of the ester toward polymerization with ionizing radiation and the removal of the inhibitor from the ester reaction product is a difficult and costly procedure.

Although the art has proposed the addition of stabilizing agents to the ethylenically unsaturated beta-hydroxy ester compositions to stabilize the compositions to premature gelation, e.g. U.S. Pat. No. 3,408,422, in many cases the addition of such agents further diminishes the sensitivity of the ester toward ionizing radiation, thereby reducing the utility of the unsaturated esters as radiation curable compositions.

SUMMARY OF THE INVENTION

In accordance with the present invention there is provided a method for preparing an ethylenically unsaturated beta-hydroxy ester composition from a polyepoxide and acrylic or methacrylic acid which is stable to premature gel formation and which is sensitive to rapid polymerization by exposure to a source of ionizing radiation wherein the reaction between the polyepoxide and the acrylic or methacrylic acid to form the beta-hydroxy ester is conducted at a temperature of less than 110°C in the presence of an divalent tin salt and an alkaline catalyst.

Ethylenically unsaturated beta-hydroxy esters prepared in accordance with the process of present invention are stabilized against premature gelation by interreaction with itself as well as with any other unsaturated monomer with which the ester may be mixed or blended and the need for polymerization inhibitors is thereby greatly diminished.

PREFERRED EMBODIMENTS

It is critical to the practice of the present invention that the reaction temperature used to prepare the beta-hydroxy ester be below 110°C. It has been determined that if temperatures in excess of 110°C are employed to react the polyepoxide and the acrylic or methacrylic acid in the presence of the alkaline catalyst and an divalent tin salt, gels and other undesirable polymeric compounds form in the reaction vessel which render the final reaction product substantially useless as a printing ink vehicle component.

Temperatures employed in the reaction to form the beta-hydroxy ester in accordance with the process of the present invention will generally vary from about 50° to 110°C and preferably about 90° to 105°C. The reaction is conducted under an inert atmosphere such as nitrogen, and may be conducted at atmospheric or reduced pressure under reflux conditions.

The tin compounds used in the practice of the present invention must be divalent salts. As will hereinafter be illustrated if tin compounds other than divalent tin salts are used in the practice of the present invention, e.g. tin compounds such as SnO, useful beta-hydroxy ester compounds are not obtained. Illustrative examples of suitable divalent tin salts useful in the practice of the present invention include the inorganic stannous acid salts as stannous nitrate, stannous phosphate, stannous sulfate, stannous chromate, organic acid stannous salts as for example, salts having the formula $Sn(OOCR)_2$ wherein R is a saturated or unsaturated straight or branched chain aliphatic substituent having about 2 to 20 carbon atoms such as stannous acetate, stannous propionate, stannous butyrate, stannous hexoate, stannous octoate, stannous laurate, stannous palmitate, stannous stearate, stannous oleate and stannous alkoxides having the formula $Sn(OR)_2$ in which R is a monovalent hydrocarbon radical, saturated or unsaturated, branched chain or straight chain, containing 1 to 18 carbon atoms, preferably 3 to 12. Representative examples of stannous alkoxides include stannous methoxide, stannous isopropoxide, stannous butoxide, stannous t-butoxide, stannous tridecanoxide, stannous heptadecanoxide, stannous phenoxide, and o, m and p-stannous cresoxides and the like.

The amount of divalent tin compounds incorporated in the reaction mixture may vary over a considerable range. In general, the amount of divalent tin compound will vary from about 0.10 to about 3.0 percent by weight of the reactants involved in the ester forming reaction and more preferably from about 0.2 to about 0.6 percent by weight of the reactants.

It is also critical to the practice of the present invention that an alkaline catalyst be incorporated in the reaction mixture used to prepare the beta-hydroxy ester. Although the art teaches the use of tin compounds as catalysts in the reaction between epoxy resins and certain carboxylic acids, e.g. U.S. Pat. No. 3,507,819, at the temperatures employed in the process of the present invention, e.g. temperatures below 110°C, the divalent tin salts are not efficient catalysts for opening of the oxirane ring of the polyepoxide compound and it is therefore necessary to employ an alkaline catalyst that will effect an opening of the oxirane ring to enable the reaction between the polyepoxide and the acrylic or methacrylic acid to proceed.

Illustrative alkaline catalysts useful in the practice of the practice of the present invention include tertiary amines, quarternary ammonium hydroxides, quarternary ammonium halides, benzyl trimethyl ammonium hydroxide, N, N-dimethylaniline, and benzyl dimethyl amine.

The amount of catalyst incorporated in the reaction mixture may vary over a considerable range. In general, the amount of the catalyst will vary from about 0.2 to about 2.0 percent by weight and more preferably from 0.6 to 0.8 percent by weight of the reactants.

The reaction to prepare the gel stable ethylenically unsaturated beta-hydroxy ester may be conducted in the presence or absence of solvents or diluents. In cases where the reactants are liquid, the reaction may be effected in the absence of solvents. When either or both reactants are solids or viscous liquids, it may be desirable to add solvents to assist in effecting the reaction. Examples of suitable solvents include inert organic liquids such as ketones, such as methyl ethyl ketone, hydrocarbons such as cyclohexane and aromatic solvents such as toluene and xylene.

The reaction to form the beta-hydroxy ester in accordance with the process of the present invention requires about a 1 to 10 hour period to be completed or until the acrylic or methacrylic acid is substantially consumed. The course of the reaction may be conveniently followed by a determination of the acidity. The reaction is considered to be substantially complete when the acidity has been reduced to an acid number of 10 or less.

The proportions of polyepoxide and acrylic or methacrylic acid employed in preparing the ethylenically unsaturated beta-hydroxy esters compositions of the present invention are preferably, stoichiometric equivalents of the polyepoxide and the acrylic or methacrylic acid are utilized.

Acrylic and methacrylic acid form a major portion of the carboxylic acids which are reacted with the polyepoxide to prepare the beta-hydroxy esters in accordance with the process of the present invention, although a portion of these unsaturated acids may be replaced by saturated acids having 3 to 18 carbon atoms such as caprylic, pelargonic, palmitic, and the like to vary the physical properties of the beta-hydroxy ester. The saturated acid may be incorporated in the reaction medium at a concentration that does not exceed 25 mole percent of the total acid reactant and is generally in the range of about 5 to about 20 mole percent.

The polyepoxides used to prepare the beta-hydroxy esters in the practice of the present invention comprise all those organic compounds containing at least two reactive epoxy groups, i.e.,

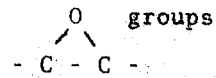

in their molecule. The polyepoxides may be saturated or unsaturated, aliphatic, cycloaliphatic, aromatic, or heterocylic and may be substituted if desired with non-interfering substituents.

Aromatic polyepoxides are the polymeric reaction products of polyhydric mono and polynuclear phenols with polyfunctional halohydrins and/or glycerol dichlorohydrin. A large number of polyepoxides of this type are disclosed in the Greenlee patents, U.S. Pat. Nos. 2,585,115 and 2,589,245. In addition many of these resins are commercial products. Typical polyhydroxy phenols useful in the preparation of aromatic polyepoxides include resorcinol and various diphenols resulting from the condensation of phenol with aldehydes and ketones such as formaldehyde, acetaldehyde, acetone, methyl ethyl ketone and the like. A typical aromatic polyepoxide is the reaction product of epichlorohydrin and 2,2-bis (p-hydroxy phenyl) propane (Bisphenol A), the resin having the following structural formula:

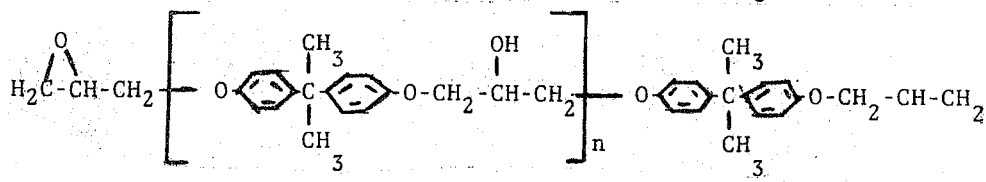

wherein $n$ is zero or an integer up to 10. Generally speaking, $n$ will be no greater than 2 or 3 and is preferably 1 or less.

In DER 332, an aromatic polyepoxide of the type above described and commercially available from the Dow Chemical Company, $n$ is zero.

Aliphatic polyepoxides are the reaction products of ephihalohydrins with aliphatic polyhydric alcohols such as trimethylol ethane, glycerol, pentaerythritol, sorbitol, trimethylol propane, erythritol, arabitol, mannitol, trimethylene glycol, tetramethylene glycol, ethylene glycol, polyethylene glycol, propylene glycol, polypropylene glycol, butylene glycol, polybutylene glycol and the like.

RD-2, the diglycidyl ether of 1,4 butylene glycol, manufactured by Ciba is an example of a commercially available aliphatic polyepoxide.

The stabilized ethylenically unsaturated beta-hydroxy ester compositions prepared by the process of the present invention are useful as radiation curable coating materials for coating a variety of substrates such as metal, paper and wood. The stabilized ester may be used along or in combination with other unsaturated compounds such as vinyl monomers and the like.

The stabilized beta-hydroxy esters are particularly useful as components of printing ink vehicles which are curable by ultraviolet radiation. In preparing such printing ink vehicles, the stabilized ethylenically unsaturated betahydroxy ester is advantageously admixed with at least one other ethylenically unsaturated polyester such as polyacrylates and polyitaconate and a photosensitizer.

A detailed description of printing ink vehicles in which the stabilized beta-hydroxy esters prepared in accordance with the present invention may be utilized as a component is contained in copending application Ser. No. 242,793, filed Apr. 10, 1972, now U.S. Pat. No. 3,804,735, the disclosure of which is incorporated herein by reference.

In general, printing inks prepared using radiation curable vehicles are prepared in the same manner as conventional printing inks only using the vehicle component as disclosed herein. Generally the printing inks contain about 30 to about 80 percent by weight of the vehicle and about 20 to 70 percent by weight of a pigment such as $TiO_2$.

In printing metal surfaces with radiation curable printing inks, the ink is applied using a printing press conventionally used for printing on a metal substrate.

Once the metal substrate, generally in the form of a sheet, is printed, the substrate is positioned to pass under a source of ultraviolet light to cure and dry the ink. In most instances, the ultraviolet light source is maintained at about 0.5 to about 5 inches from the printed substrate undergoing irradiation.

Rapid drying of the ink is effected within a 0.5 to 2.0 second period using ultraviolet light emitted from an artificial source having a wavelength in the range between 400A and 1,800A. The output of commercially available ultraviolet lamps generally vary between 100 watt/in. to 200 watt/in. of lamp surface.

Mercury vapor discharge lamps of quartz are the preferred source of ultraviolet light. Medium-pressure mercury vapor discharge lamps of quartz may be employed if desired.

As regards any particular conditions of source and distance, the duration of the irradiation treatment can be determined by a few trials.

The present invention is illustrated, but not limited, by the following Example:

EXAMPLE

To a reaction vessel, equipped with a condenser, stirrer, thermometer, and nitrogen inlet tube was charged the following reactants:

| | |
|---|---|
| Bisphenol A - Diglycidyl ether (DER 332) | 397 grams (1.15M) |
| Glacial acrylic acid | 132.8 grams (1.84M) |
| Pelargonic acid | 31.6 grams (0.2M) |
| Benzyl dimethyl amine | 4.0 grams |
| Stannous stearate (in 50 mls. methylethyl ketone | 5.7 grams |

The temperature of the reaction mixture was raised to and maintained at 100°C for 6.0 hours under nitrogen atmosphere. Titration of a sample of the reaction mixture with a 0.2N alcoholic KOH solution at this time indicated that the reaction mixture had an acid number of 1.3 indicating substantially complete reaction of the bisphenol ether with the acrylic acid.

A portion of the reaction products was heated in an open aluminum pan at a temperature of 160°C for more than 120 minutes without evidence of the gel formation.

By way of contrast when the procedure of the Example was repeated with the exception that stannous stearate was not employed, the reaction mixture gelled within 3 hours after initiation of the reaction.

By way of further contrast when the procedure of the Example was repeated with the exception that the benzyl dimethyl amine catalyst was not employed, after 6 hours of heating in the presence of stannous stearate, the acid number of the reaction mixture was 180 indicating that only a minimal amount of the reaction components had been formed into a beta-hydroxy ester product.

By way of still further contrast when the procedure of the Example was repeated with the exception that SnO was substituted for stannous stearate, the reaction mixture had an acid number of 90 after 6 hours and an acid number of 70 after 10 hours of heating indicating that a useful beta-hydroxy ester compound could not be obtained within any practical reaction period. When this same reaction was attempted in the absence of the benzyl dimethyl amine catalyst, the acid number of the reaction mixture after 6 hours of heating was 205.

What is claimed is:

1. A method of preparing an ethylenically unsaturated beta-hydroxy ester stable to premature gelation comprising reacting at a temperature below 110°C a polyepoxide having at least 2 epoxide groups in the polyepoxide molecule with an ethylenically unsaturated carboxylic acid selected from the group consisting of acrylic and methacrylic acid in the presence of a small but effective amount of an divalent tin salt and an alkaline catalyst to prepare the beta-hydroxy ester and then recovering the ester.

2. The method of claim 1 wherein the acid is acrylic acid.

3. The method of claim 1 wherein the polyepoxide is the diglycidyl ether of Bisphenol A.

4. The method of claim 1 wherein the divalent tin salt is stannous stearate.

5. The method of claim 1 wherein the reaction is conducted in the presence of a tertiary amine catalyst.

6. The method of claim 5 wherein the tertiary amine catalyst is benzyl dimethyl amine.

7. The method of claim 1 wherein the divalent tin salt is present in the reaction mixture at a concentration of 0.1 percent to 1.0 percent by weight.

8. The method of claim 1 wherein the temperature of the reaction is about 90°C to 105°C.

* * * * *